A. O. BAILEY.
ELECTRIC HEATER.
APPLICATION FILED AUG. 6, 1914.

1,147,916.

Patented July 27, 1915.

WITNESSES:
René Bruine
Fred White

INVENTOR:
Alfred O. Bailey,
By Attorneys,
Fraser. Turk & Myers

UNITED STATES PATENT OFFICE.

ALFRED O. BAILEY, OF NEW YORK, N. Y., ASSIGNOR TO GOLD CAR HEATING & LIGHTING COMPANY, OF NEW YORK, N. Y., A CORPORATION OF NEW YORK.

ELECTRIC HEATER.

1,147,916.   Specification of Letters Patent.   Patented July 27, 1915.

Application filed August 6, 1914. Serial No. 855,351.

*To all whom it may concern:*

Be it known that I, ALFRED O. BAILEY, a citizen of the United States of America, residing in the borough of Brooklyn, county of Kings, city and State of New York, have invented certain new and useful Improvements in Electric Heaters, of which the following is a specification.

My invention relates to electric heaters and is particularly adapted to that type of such apparatus as is employed for the heating of passenger cars.

The invention has for its object to improve the construction of such heater so that in a heater employing a plurality of heating units, any one of the said heating units may be readily removed through the front of the casing by a simple removal of the front plate or screen and without disturbing the other heating units within the heating casing, and without the removal of the end plates, and further to attain this object in a quick and economical way.

A further object of my invention is to provide a construction of heater wherein any of the electric conductors which are connected to the heater may be disconnected therefrom without danger of touching the other wires, whereby accidents may be avoided.

My invention consists in the provision of an improved end block for each heater unit within the casing so constructed as to be capable of independent support within the casing, and of independent removal therefrom, and so formed that a space is provided for the attachment of electric conductors thereto and permitting their removal without liability of touching other conductors.

A desirable form in which my invention may be embodied is illustrated in the accompanying drawings, wherein,—

Figure 1:
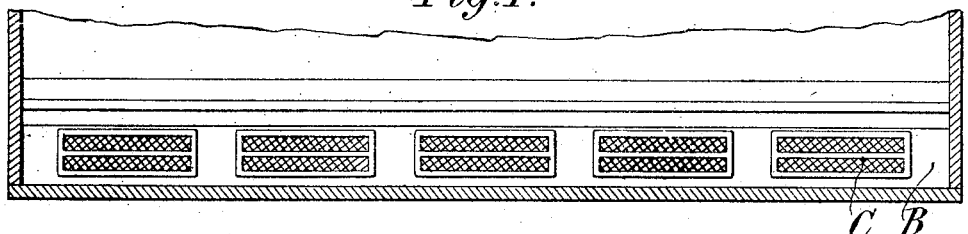
Figure 2:
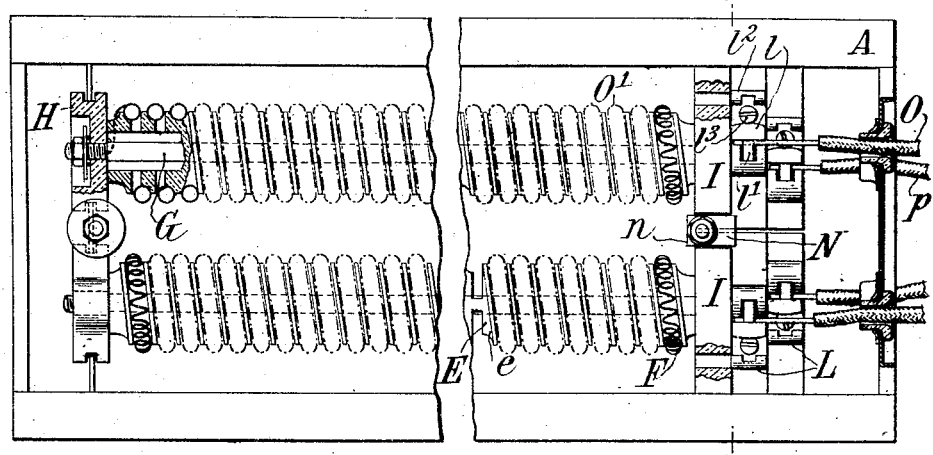
Figure 4:
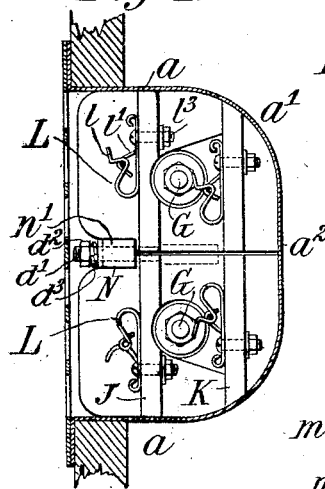
Figure 5:
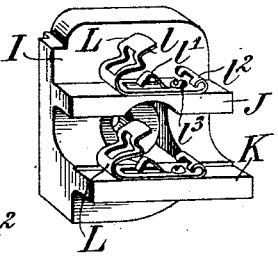
Figure 3:
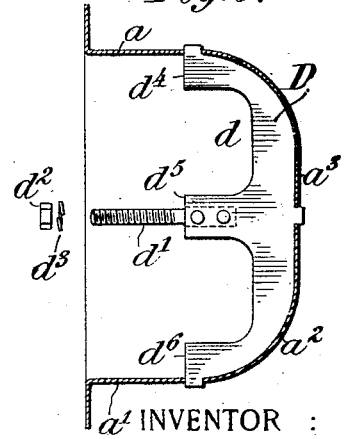
Figure 6:
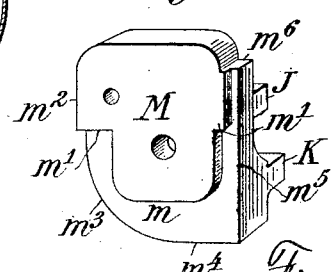

Figure 1 is a longitudinal section through a car, illustrating the shields or covers of the casings in place upon the riser of the car seats. Fig. 2 is a front view of a heater and its casing having the front plate removed, partly broken and partly in section. Fig. 3 is a cross-section of a heater casing on the line 3—3, Fig. 2, the heater unit being removed and the casing and supporting plate being illustrated. Fig. 4 is a similar view with the heater unit, cover and my end block in place. Figs. 5 and 6 are perspective views of the outer and inner faces of my improved end block.

My invention is illustrated as applied to that type of heater wherein a casing A is inserted within the riser B of the car seat and has a front plate or cover C which has openings to permit the escape of heat from the heater to the car, and is removable by removing the fastening screws. It is advisable to divide the heater contained in such casing into small units rather than to have a large heater unit, not only for the purpose of controlling the supply of heat so as to increase or diminish the same at will, but also to reduce the chances of the heater getting out of order, and so depriving the railroad of the car while the heater is being repaired.

It is highly desirable where a plurality of heating units are employed within each casing that each heating unit should be capable of being removed separately and without interfering with or preventing the continued use of the other unit or units within the casing. My invention is particularly useful in connection with such a heater, and it is designed to provide improved means for supporting the heater within the casing securely and against misplacement therein. Further to provide means whereby each heater unit may be removed separately as desired without interfering with the other unit or units, and further to provide a construction wherein the conductors may be attached or detached as desired without danger to the electrician from the presence of live wires.

I have illustrated the heater casing A as being provided with retaining plates D, each of which is recessed at $d$ for the reception of a heater unit, and each of which is preferably provided with means for retaining the heater units in place, which may comprise a bolt $d'$ having a movable nut $d^2$ with a locking washer $d^3$.

The heater unit illustrated is of the conventional type employing a core E usually made of porcelain and having corrugations $e$ which receive the coils of a spiral resistance wire F which furnishes the heating means. In the heater illustrated a metallic rod G passes through the hollow center of the core E and is secured to the end blocks at each end by nuts. In the construction illustrated the heater wire passes through a perforation in an end block H, and is connected to the end of the rod G, whereby the said rod forms the return wire.

The improved means invented by me for holding the heater units in place and permitting their independent removal, and for accomplishing the other advantages stated comprise an end block I of which as many are provided as there are heating units. In the form illustrated the casing contains two heating units, and accordingly two end blocks I are illustrated. I will now describe one of said end blocks. It is provided with ledges J K, J being the top or shorter ledge and K the bottom or longer ledge, and upon each of these ledges is mounted means for receiving the electric conductors and connecting them to the heater wires. As illustrated such means comprise clips L which are well-known and form no part of the present invention. The said clips have spring members $l$ $l'$ which receive and hold an electric conductor when pressed together, and they have further a clamp $l^2$ for holding the other conductor. These clips are secured to the ledges J K as by screws $l^3$. A greater width of the lower ledge K permits the clip to be maintained in a vertical plane outside that occupied by the clip on the upper or top ledge J, and therefore the wires attached to either of the said clips may be connected or disconnected without danger of hitting the other wires with the hands. Upon its inside face the end block I has a projecting portion M which forms a ledge $m$ that enters the recesses $d$ in the plate D, and said ledge is curved to correspond with the curve of the said recesses so as to permit the easy insertion and removal of the said end block, and has straight portions $m'$, $m^2$ which rest against the faces $d^5$ $d^6$ of the said retaining plate. The casing A has its top and bottom portions $a$ $a'$ (Fig. 3) substantially straight, and is usually curved at $a^2$ for connection to the back or bottom portion $a^3$. Therefore, in order that the said end block shall snugly rest against the casing and be held firmly in place, I prefer to form the outer edges thereof straight, as at $m^2$ and to provide a curved portion $m^3$, whereby the said outer edge is connected to the back edge $m^4$ and is adapted to snugly rest against the casing. The adjacent edges of the end blocks are straight, as at $m^5$, and by this means either end-block may be inserted in place or removed without interfering with the other end block. The said end blocks are preferably provided with shoulders $m^6$ upon the front of their inner edges $m^5$, and these are convenient to retain them in position by means of the retaining plate N which is perforated to pass over the bolt $d'$ and lies under the nut $b^2$ thereof. Said retaining plate has a top portion $n$ and a depending flange $n'$, and these two parts embrace a portion of the front edge at $m^6$ and of the outer face of each of the end blocks and hold them in position. By means of said retaining means the end blocks and connected heaters are firmly held against the retaining plate D in such a manner as to be securely held against rattling or accidental dislodgment and at the same time to permit their independent removal upon removal of the retaining means. In the construction illustrated the wire O is the leading-in wire which is connected to the heater coil O', and the wire P is the return wire that is connected to a wire leading to the rod G.

The present invention relates to the end blocks, and the casing and its connected parts form no part thereof, and are not claimed therein, but are claimed in the application of F. T. Kitchen, Serial No. 855,391, filed August 6, 1914.

The invention is illustrated in connection with a car having seats running longitudinally, but, of course, the type of car is unessential, and the invention is equally useful in connection with any of the standard types of cars.

I have illustrated the preferred form of my invention, but I do not wish to be necessarily limited to the precise construction illustrated, as changes may be made within the limits of the appended claims.

What I claim is:—

1. In an electric heater having a casing and a heater therein, an end block in said casing, having a plurality of perforations and a transverse ledge adjacent each perforation, and means for supporting said heater in said end block.

2. In an electric heater having a casing and a heater therein, an end block in said casing, having a plurality of perforations and a transverse ledge adjacent each perforation, said ledges having different widths, and the top ledge being the narrowest and the ledges increasing in width toward the bottom, and means for supporting said heater in said end block.

3. In an electric heater having a casing, a recessed retaining plate, and a heater therein, an end block for said heater formed of insulating material having perforations for the introduction of electric conductors, and having a transverse ledge on the outside adjacent each perforation, said ledges being of increasing width from the top ledge to the bottom ledge, and said end block having a ledge on the inside, adapted to enter the recess in said retaining plate.

4. In an electric heater having a casing, a recessed retaining plate, and a heater therein, an end block for said heater formed of insulating material having perforations for the introduction of electric conductors, and having a ledge on the outside adjacent each perforation, said ledges being of increasing width from the top ledge to the bottom ledge, and said end block having on its inside face a flat portion adapted to rest against a flat face of said retaining plate, and a ledge adapted to enter a recess therein.

5. In an electric heater having a casing, a recessed retaining plate and a plurality of heaters therein, end blocks for each of said heaters, formed of insulating material, having perforations for the introduction of electric conductors, said blocks having their outer edges shaped to the casing, and their inner edges straight, and each block having a ledge adapted to enter a recess in said plate, whereby said blocks may be received and held in said end plate and are independently removable therefrom.

6. In an electric heater having a casing, a recessed retaining plate, a removable retaining bracket secured thereto and a plurality of heaters therein, end blocks for each of said heaters, formed of insulating material, having perforations for the introduction of electric conductors, said blocks having their outer edges shaped to the casing, and their inner edges straight, and each block having a ledge adapted to enter a recess in said plate, whereby said blocks may be received and held in said end plate and are independently removable therefrom, and each block having a shoulder at the front of said inner edge, adapted to receive said bracket, and whereby said end blocks are securely held in position in said casing and are capable of independent removal upon removing said bracket.

7. In an electric heater having a casing with a curved rear wall and having its top and bottom substantially straight, having a retaining plate therein extending partway toward the front of the casing and having a plurality of recesses therein, and having a retaining bracket removably attached to said plate and a plurality of heaters therein, end blocks for each of said heaters, formed of insulating material, having perforations for the introduction of electric conductors, said blocks having their top and bottom edges straight, and their rear edges curved to fit said casing, and each end block having on its inside face a ledge adapted to enter a recess in said casing and shoulders adapted to abut against the front of said plate, and the adjacent edges of said end blocks being straight and said retaining bracket adapted to securely hold said end blocks in said plate when secured in position, and each of said end blocks adapted to be independently removed upon the removal of said bracket.

8. In an electric heater, having a casing, and a heater therein, an end block in said casing, having a plurality of perforations, and a transverse ledge adjacent each perforation, and means on each ledge for attachment to the heater wires and to the leading-in and return wires respectively, and means on said end block for supporting said heater.

9. In an electric heater having a casing, a transverse retaining plate therein having a pair of recesses, and a pair of electric heaters therein, end blocks for each heater formed of insulating material, having straight inner edges and being mounted in pairs in said retaining plate, with said inner edges next to one another, and the outer edge of each of said end blocks adapted to freely pass into the casing, whereby said end blocks may be independently removed from said casing.

10. In an electric heater having a casing, a hollow core therein, a heating wire on said core and having a rod extending therethrough and connected at one end to said wire, an end block of insulating material removably mounted in said casing, and having a perforation for said rod, a ledge in said end block near said perforation, adapted to support wire connecting means, a narrower ledge adjacent the first mentioned ledge adapted to support like means, and said end block being perforated at said narrower ledge for the passage of the heater wire.

11. In an electric heater having a casing, and having a retaining plate having a plurality of recesses, an end block of insulating material adapted to be entered in each recess and to be independently removable therefrom, each of said end blocks having a plurality of ledges of increasing width toward the bottom ledge, and said end block being perforated near said ledges.

In witness whereof, I have hereunto signed my name in the presence of two subscribing witnesses.

ALFRED O. BAILEY.

Witnesses:
HENRY M. TURK,
FRED WHITE.